Figure 1:
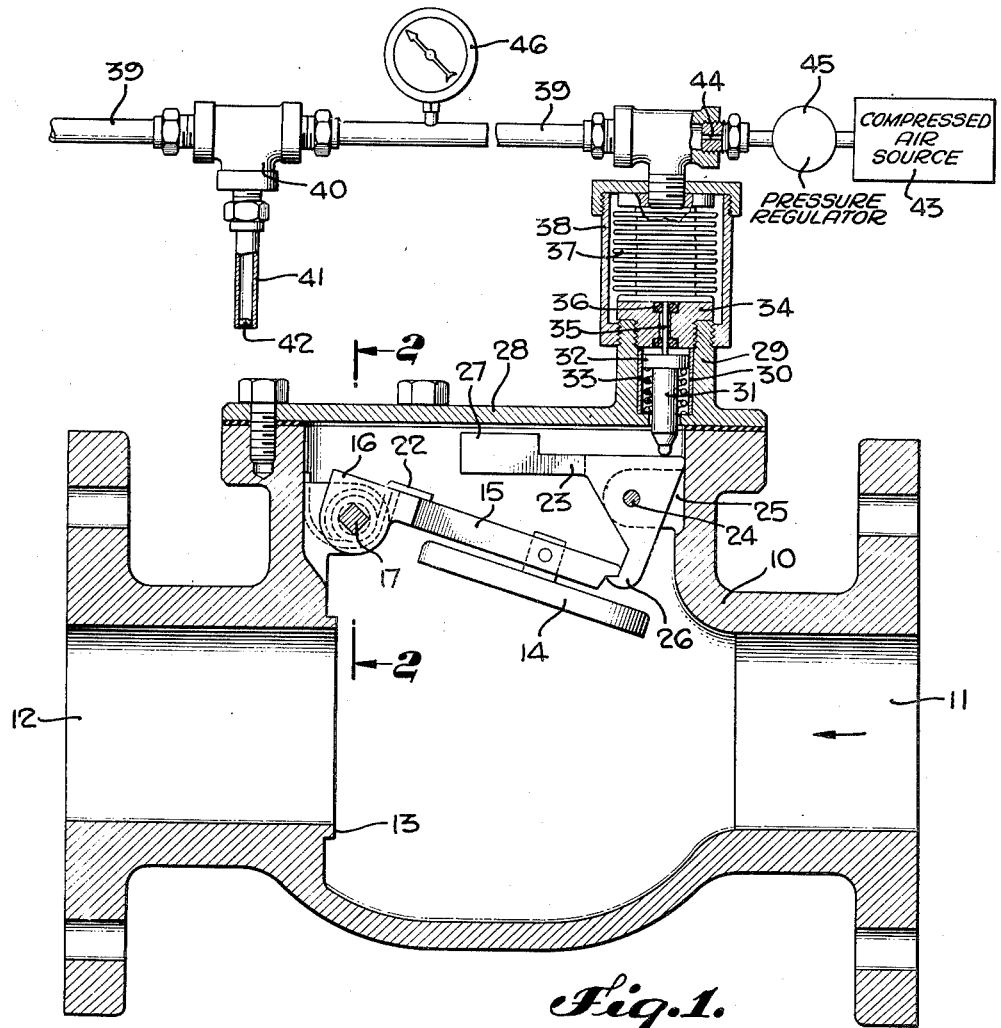

March 30, 1954  F. W. McRAE  2,673,707
SAFETY CUTOFF VALVE HAVING BELLOWS CONTROLLED TRIP
Filed July 5, 1949

FRED W. McRAE,
INVENTOR.

BY
Hazard & Miller
ATTORNEYS

Patented Mar. 30, 1954

2,673,707

UNITED STATES PATENT OFFICE 2,673,707

SAFETY CUTOFF VALVE HAVING BELLOWS CONTROLLED TRIP

Fred W. McRae, Los Angeles, Calif.

Application July 5, 1949, Serial No. 103,137

2 Claims. (Cl. 251—73)

This invention relates to a remotely controlled valve.

There are many situations wherein a pipe line or conduit is conducting gas, oil or other highly inflammable substance into a plant or building and wherein a valve is installed designed to quickly shut off the supply of the inflammable substance in the event of fire, explosion or other contingency. Heretofore valves of this general character have been designed wherein the closure for the valve is latched in its open position and wherein a temperature-responsive means is effective to cause the latch to release the closure and allow it to close. Usually, however, the temperature-responsive means is either incorporated in the structure of the valve itself or is located very close to the valve so that the valve will not be tripped or allowed to close until the temperature at the valve or its immediate vicinity exceeds a predetermined degree. It frequently occurs, however, that a disastrous fire may occur in the plant or building at a point remote from the valve so that the temperature at or near the valve never reaches the predetermined degree required to trip the valve. Consequently the valve, under these circumstances, may remain open and the fire, in effect, fed by the fuel passing therethrough. It is also desirable to be able to automatically trip the valve to allow it to close not only in the event of a fire but also in the event of other contingencies occurring such as, for example, an explosion or an accident occurring which damages certain equipment.

It is an object of the present invention to provide a novel control for latched self-closing valves which is so designed that the valve closure can be instantly released to close in the event of any one of several contingencies occurring and which may occur at points remote from the valve. In this manner the valve may be located in the pipe line on the exterior of the building or plant if this is desirable and the control mechanism extended around the interior of the plant or building to all dangerous locations. Then, in the event that a fire, explosion or accident takes place within the plant or building the valve will be automatically and quickly tripped so as to close the supply line at a point on the exterior or remote from the plant where the valve is not apt to become damaged or broken as a result of the fire or other calamity.

Figure 2:
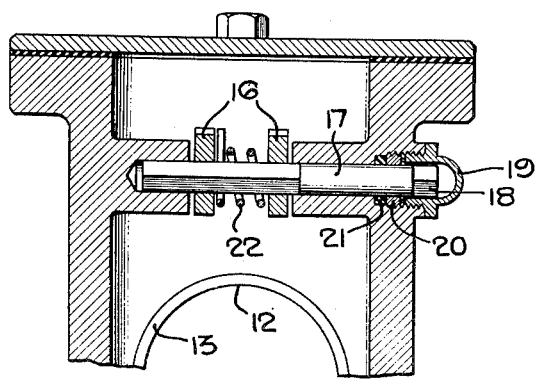

With the foregoing and other objects in view, which will be made manifest in the following detailed description and specifically pointed out in the appended claims, reference is had to the accompanying drawings for an illustrative embodiment of the invention, wherein:

Figure 1 is a sectional view through the remotely controlled valve embodying the present invention; and Fig. 2 is a partial view in vertical section taken substantially upon the line 2—2 upon Fig. 1 in the direction indicated.

Referring to the accompanying drawings wherein similar reference characters designate similar parts throughout, 10 indicates a valve body having an inlet 11 and an outlet 12 between which there is a valve seat 13 for a valve closure 14. The valve closure 14 is mounted on an arm 15 having ears 16 through which a pintle 17 extends. The pintle has a squared portion extending through the ears so that on turning the pintle by means of its squared end 18 the arm 15 and consequently the closure 14 can be swung into open position. The squared end 18 is normally enclosed within a cap 19 behind which there is a nut 20 compressing packing 21 about the pintle. While the arm 15 and closure 14 can be allowed to close by gravity a torsion spring 22 is preferably disposed about the pintle and urges the closure into closed position.

Within the body 10 a latch 23 is pivotally mounted as at 24 between ears 25. This latch has a pawl 26 engageable with the end of the arm to latch the closure 14 in open position. The latch carries a weight 27 by which the latch is normally urged to swing in a counterclockwise direction, as viewed in Fig. 1, to effect a release of the closure and allow the closure to seat on its seat 13.

On the cover 28 of the valve housing there is an upstanding boss 29 which is drilled to receive a liner or bushing 30 within which a pin 31 is slidable. The lower end of this pin extends into the valve body and normally engages the latch to resist its turning about its pivot 24 under the influence of weight 27. The pin is flanged as at 32 to provide a spring seat for a compression spring 33 that is compressed beneath the bottom of the flange and the bottom of the hole in the boss 29. The top of the boss is closed by an internal cap 34 through which there is an aperture adapted to receive a small stem 35 that is integral with the pin 31. This stem is slidable between O rings 36 which form seals thereabout and normally engages the bottom of an expansion chamber provided by a sylphon metallic bellows 37. This bellows has its lower end engageable with the top of the cap 34 and the top of the stem 35. It is preferably housed within a suitable housing 38 that is threaded on top of the boss 29. The interior of the bellows 37 is in constant communication with the interior of a pipe or tubing 39 that may be extended from the location of the valve to various points within the plan or building that it is desired to protect. This pipe or tubing is constantly filled with a fluid such as air or a gas under superatmospheric pressure. The pressure within the tubing need not exceed atmospheric pressure to any great extent and in the normal situation the pressure existing in the tubing 39 exceeds the maximum barometric pressure of the atmosphere at the location of the installation by only a few ounces per square inch. At various points along the length of the tubing 39 there are T's 40 the lateral branches of which carry nipples 41 in the bottoms of which there are fusible seals 42. These seals may be formed of low melting point metals or the equivalent designed to melt when a predetermined temperature is exceeded. The pressure within the tubing 39 is constantly maintained by a source of compressed air indicated at 43. This may be either an air compressor or a supply of compressed air maintained in a bottle which is released through a small orifice 44 into the tubing by means of a pressure regulator 45. 46 indicates a pressure gauge which may be used to indicate the pressure that is maintained in the tubing 39.

It will be appreciated that the valve may be located at a point quite remote from any one of the temperature released seals 42. Thus, in a typical installation where the valve is in a line containing highly volatile fuels, such as gasoline, the valve may be located externally of the plant or building and at some distance therefrom. The tubing 39, however, can be conducted into the building and the nipples 41 with their seals 42 can be strategically located at points where fire may occur.

As long as the pressure is maintained in the tubing 39 the bellows 37 is kept in fully expanded position, causing the stem 35 to hold the pin 31 in engagement with the latch 23, latching the closure 14 open. However in the event of a fire melting out one or more of the seals 42, the pressure in 39 and in the bellows is immediately released. This allows the bellows 37 to contract and the compression spring 33 to lift the pin 31. The weight 27 is then effective to pivot the latch causing it to release the closure and the closure to close. The pressure in 39 is constantly maintained despite minor amounts of leakage by being constantly built up from the compressed air supply at 43 through the orifice 44. This orifice is capable of transmitting small amounts of fluid but is incapable of maintaining the pressure when one of the seals 42 has been melted out of its nipple.

It will be appreciated that any number of T's 40, nipples 41 and seals 42 may be located at various points along the tubing 39 and that all of these are instantly effective to bring about a closing of the valve. It is not essential that a seal 42 be of such a character as to require a predetermined temperature to be exceeded to release the pressure in tubing 39. Other means may be employed to release the pressure in 39, such as, for example, a readily frangible nipple 41 which could be broken in the event of an explosion or similar accident or, if desired, the tubing 39 may have a manual valve incorporated therein which can be opened to permit the pressure to escape in the event that it is desired to manually instead of automatically close the valve. When it is desired to re-seat the valve after it has once been tripped the cap 19 may be removed and on the application of a wrench or key to the squared end 18, the closure may be swung into open position to engage the latch against the action of the torsion spring 22.

The improved control for the valve is highly advantageous in that an opening of the conduit 39 by any means whatsoever brings about a very quick reduction in pressure in the bellows 37 to allow the bellows to contract. Furthermore, as the fluid within the conduit 39 is but a gas, it has little if any cooling effect upon the seals 42. A serious objection to temperature - controlled valves of this character heretofore has been that the temperature-responsive means employed is either kept too cool by surrounding structure that is cold, or surrounding structure conducts away the heat so rapidly that the temperature-responsive means does not promptly function. In the case of a closed gas, as in this construction, the gas has little, if any, effect on cooling the seals 42 and effectively assists in insulating these seals instead of as a conduit for conducting heat from them.

It will be appreciated that the valve may be located in a supply line or supply main at a point quite remote from the seals 42 or other means for releasing the pressure in the tubing 39 which can be strategically located where most desired. Consequently when the valve is tripped it may be tripped at a location where it is not apt to be seriously damaged and can consequently perform its intended purpose.

While it is highly preferable that the conduit contain air or gas under superatmospheric pressure, it will be appreciated by those skilled in the art that, by a minor alteration in the operative connection between the bellows and the latch, the contents of the tube or conduit might be maintained under a subatmospheric pressure or partial vacuum, it being merely essential that a pressure differential between the interior of the tubing and the expansion chamber and the surrounding atmosphere exist.

A feature of using a gas including air in the tubing 39 either at superatmospheric pressure or subatmospheric pressure, resides in the fact that the gas will create very little static head if one or more portions of the tubing 39 extend vertically for any substantial distance as in a building. If the tubing 39 extended vertically for any substantial distance and contained a liquid, the static head developed by the liquid in the tubing would exert considerable pressure in the bellows 37 so that the valve may not be tripped even though one of the seals 42 at a high elevation were melted. By using a gas in the tubing this difficulty is completely overcome.

Various changes may be made in the details of construction without departing from the spirit and scope of the invention as defined by the appended claims.

I claim:

1. A valve comprising a valve housing having an inlet and an outlet and a valve seat therebetween, a valve closure swingably mounted in the housing adapted to seat upon said seat, a latch pivotally mounted in the housing engageable with the valve closure when fully open, there being a passage through a wall of the housing, a flanged pin reciprocable therein, said pin having its flange fitting the walls of the aperture and being engageable with the latch to hold the latch in engagement with the valve closure, a compression spring in the aperture around the pin effective against the flange urging the pin outwardly, a cap at the outer end of the aperture against which the flange on the pin may seat, a stem extending through said cap, sealing means between the stem and cap, a bellows mounted on the housing and engageable with the stem to hold the pin inwardly of the cap against the action of the spring, and means for conducting pressure to the interior of the bellows.

2. A valve comprising a valve housing within which there is a chamber having an inlet and an outlet and a valve seat therebetween, a valve closure in said chamber swingably mounted therein adapted to seat upon said seat, a latch pivotally mounted within said chamber in the housing engageable with the valve closure when fully open, there being a passage through a wall of the housing from said chamber to the exterior of the housing, a flanged pin reciprocable therein, said pin having its flange fitting the walls of the aperture and being engageable with the latch to hold the latch in engagement with the valve closure, a compression spring in the aperture around the pin effective against the flange to urge the pin outwardly, a cap at the outer end of the aperture against which the flange on the pin may seat, a stem slidably extending through said cap, pressure-responsive means mounted on the housing engageable with the stem to hold the pin inwardly of the cap against the action of the spring, and means for conducting pressure to the pressure-responsive means to cause the pressure-responsive means to hold the stem in the mentioned position until pressure is released thereon and then permit the flange on the pin to seat on said cap.

F. W. McRAE.

References Cited in the file of this patent
UNITED STATES PATENTS

| Number | Name | Date |
|---|---|---|
| 341,902 | Gray | May 18, 1886 |
| 1,619,500 | Econopouly | Mar. 1, 1927 |
| 1,643,753 | Slattery | Sept. 27, 1927 |
| 1,727,503 | Franzheim | Sept. 10, 1929 |
| 1,897,678 | Schiorring | Feb. 14, 1933 |
| 2,296,648 | McMahon | Sept. 22, 1942 |
| 2,324,552 | Bailey | July 20, 1943 |
| 2,400,372 | Rider | May 14, 1946 |